United States Patent
Lichtenau et al.

(10) Patent No.: US 9,336,392 B2
(45) Date of Patent: *May 10, 2016

(54) VERIFICATION OF INTELLECTUAL PROPERTY CORE TRUSTED STATE

(71) Applicant: International Business Machines Corporation, Armonk, NY (US)

(72) Inventors: Cedric Lichtenau, Stuttgart (DE); Martin Padeffke, Hemmingen (DE); Thomas Pflueger, Leinfelden-Echterdingen (DE); Hagen Schmidt, Tuebingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/856,627

(22) Filed: Sep. 17, 2015

(65) Prior Publication Data

US 2016/0004865 A1 Jan. 7, 2016

Related U.S. Application Data

(63) Continuation of application No. 14/306,284, filed on Jun. 17, 2014.

(51) Int. Cl.
*G06F 12/14* (2006.01)
*G06F 21/57* (2013.01)
*G06F 11/30* (2006.01)

(52) U.S. Cl.
CPC .......... *G06F 21/57* (2013.01); *G06F 11/3037* (2013.01); *G06F 11/3055* (2013.01); *G06F 12/1425* (2013.01); *G06F 2212/1052* (2013.01); *G06F 2221/034* (2013.01)

(58) Field of Classification Search
CPC ......... G06F 11/22; G06F 12/16; G06F 15/78; G06F 19/00
See application file for complete search history.

(56) References Cited

U.S. PATENT DOCUMENTS

| | | | |
|---|---|---|---|
| 7,032,081 B1 * | 4/2006 | Gefen | G06F 15/7814 711/103 |
| 7,194,658 B2 | 3/2007 | Staton et al. | |
| 7,401,315 B2 | 7/2008 | Duan et al. | |
| 7,673,264 B1 | 3/2010 | Darbinyan et al. | |
| 8,286,113 B1 | 10/2012 | Bridgford et al. | |
| 8,533,647 B1 | 9/2013 | Gangadharan et al. | |
| 8,645,897 B1 | 2/2014 | Nandini et al. | |
| 2006/0075312 A1 * | 4/2006 | Fischer | G06F 21/74 714/48 |
| 2009/0157359 A1 * | 6/2009 | Chernoff | G06F 9/542 702/186 |
| 2012/0191400 A1 * | 7/2012 | Sontakke | G01R 31/31917 702/119 |
| 2014/0006758 A1 * | 1/2014 | Rotem | G06F 9/30043 712/228 |

OTHER PUBLICATIONS

Appendix P—"List of IBM Patents or Patent Applications Treated As Related".

(Continued)

*Primary Examiner* — Amir Mehrmanesh
(74) *Attorney, Agent, or Firm* — Isaac J. Gooshaw

(57) ABSTRACT

Secure initialization of the state of an electronic circuit. A processor determines the trusted state of one or more architecture state registers of an intellectual property core. The processor clears entries in a memory of the intellectual property core. The processor verifies that state machines, included in execution logic of the intellectual property core, have not generated output.

5 Claims, 3 Drawing Sheets

(56) References Cited

OTHER PUBLICATIONS

Deshpande, "Verification of IP-Core Based SoC's", 9th International Symposium on Quality Electronic Design, pp. 433-436, © 2008 IEEE, DOI 10.1109/ISQED.2008.73, 0-7695-3117-2/08, IEEE Computer Society.

U.S. Appl. No. 14/306284, Entitled "Verification of Intellectual Property Core Trusted State", filed Jun. 17, 2014.

\* cited by examiner

VERIFICATION OF INTELLECTUAL PROPERTY CORE TRUSTED STATE

BACKGROUND OF THE INVENTION

The present invention relates generally to the field of integrated circuits, and more particularly to attesting trusted state.

The rise in email viruses, trojans, spyware, phishing scams, key-stroke loggers, and security exploits have become a part of many computing landscapes. Some computing infrastructures were built with a premium on openness and interoperability, which has promoted creativity and innovation. However, this same openness can be problematic for security. Experience has shown that the access control model of many operating systems is inadequate against many types of attacks on a computing system, particularly in the hands of inexpert users. As a result, trusted or verified computing, in some form, is becoming part of the computing landscape.

SUMMARY

One embodiment of the present invention provides a method to securely initialize the state of an electronic circuit. A processor determines trusted state of one or more architecture state registers of an intellectual property core. The processor clears entries in a memory of the intellectual property core. The processor verifies that state machines, included in execution logic of the intellectual property core, have not generated output.

One embodiment of the present invention provides a semiconductor device to securely initialize the state of an electronic circuit. The semiconductor device comprising: one or more architecture state registers; a memory; a execution logic; a first device connected to and configured to monitor the architecture state registers and execution logic; and a second device connected to the memory and first device, wherein the second device controls whether the execution logic is integrated into the electronic circuit to process programming instructions.

DETAILED DESCRIPTION

Figure 1:
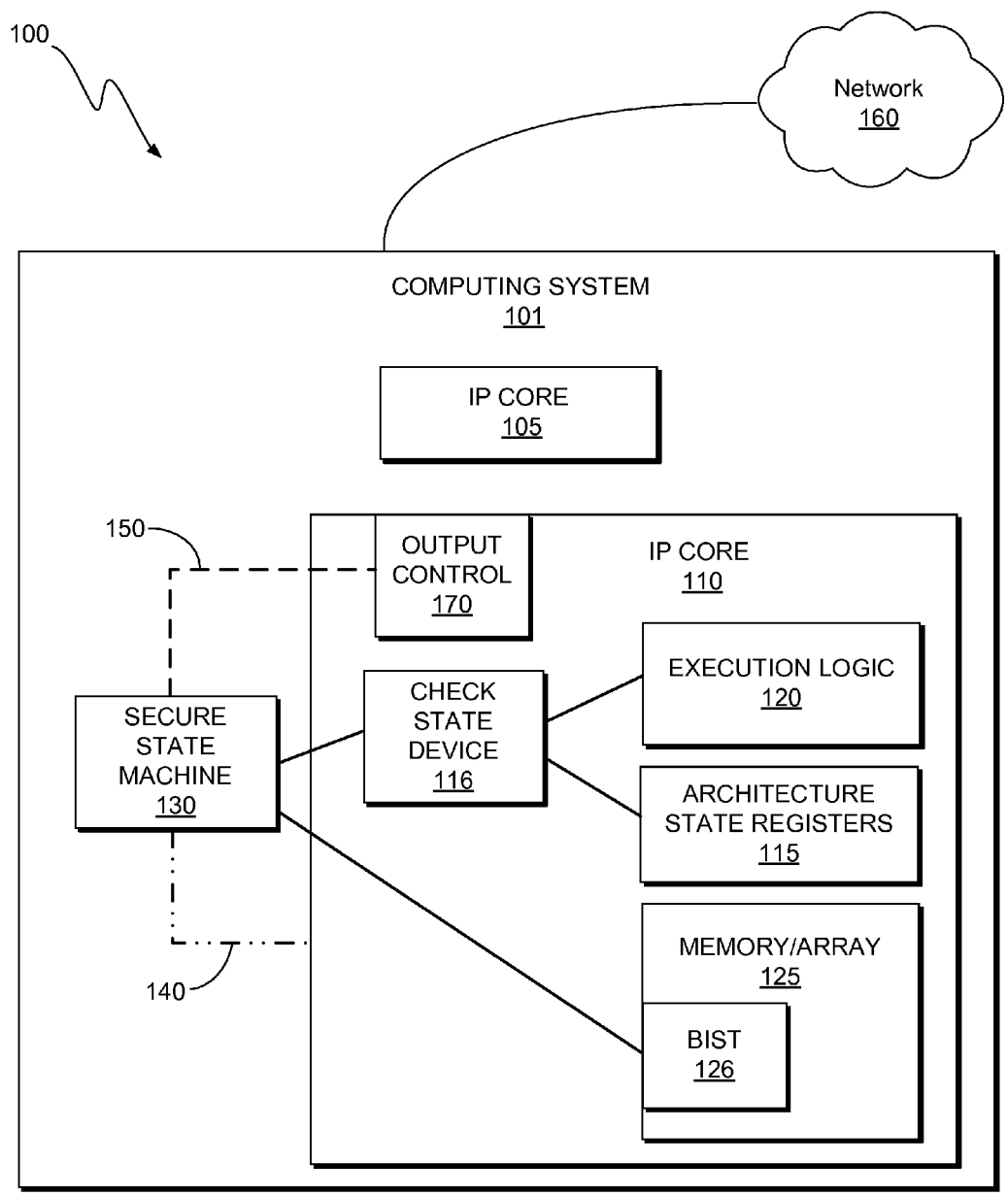
FIG. 1 is a functional block diagram illustrating a secure computing environment, environment, in accordance with an exemplary embodiment of the present invention.

System-level integration relies on reuse of previously created designs that have been provided either from within an enterprise or from a commercial provider. Libraries of pre-developed blocks of logic have been developed that can be selected and included in a circuit design. Such library modules include, for example, adders, multipliers, filters, and other arithmetic and digital signal processing (DSP) functions from which system designs can be readily constructed. The library modules may further include memories and storage elements. The engineering community sometimes refers to these previously created designs as "design modules," "cores," "IP cores" (intellectual property cores), or "logic cores," and such terms may be used interchangeably herein. The use of pre-developed IP cores permits faster design cycles by eliminating the redesign of circuits. Thus, using cores from a library may reduce design costs. Such IP cores may often be available for purchase by third parties who desire the functionality provided by the core, but do not have the time and/or resources necessary to design them.

IP cores include a circuit design in the form of source code or a "netlist" that may be used in implementing the design in a programmable IC, such as a field programmable gate array (FPGA). IP cores may be parameterizable. That is, the designer may specify values of parameters to tailor certain core functionality according to the designer's needs. The core may be integrated into a design by instantiating the source code or netlist. The IP core is then placed and routed along with the rest of the design to provide the desired functionality.

Incorporation of an IP core into a larger design, however, may not be a simple task. For example, different IP cores included in a design may be configured to communicate using different bus protocols. In order to integrate a core, a designer often must create interface logic, sometimes referred to as "glue logic," to connect the IP core to a standard bus used in the design. Integration can be a time consuming process. To ease the integration process, integrated software environments (ISEs) automate much of the integration process. These ISEs automatically generate wrapper code containing the required interconnect logic and allow the designer to configure some parameters of the core. This may be referred to as a core generation. The generated core is then placed and routed along with the rest of the design.

The IP cores are verified using verification modules (also known as verification IPs or VIPs). VIPs are standard-compliant and reusable verification blocks that are used in the design verification tools for functional verification of the cores. Examples of VIPs include bus functional models, traffic generators, protocol monitors, and functional coverage blocks. The VIPs are connected to the I/O ports of the IP cores to initiate the verification process.

An IC design is often verified in two stages, IP level verification and SoC level verification. For IP level verification, the design verification apparatus verifies each IP core using a corresponding VIP, and for SoC level verification, it verifies the SoC as a whole, which may include verifying two or more IP cores together using two or more VIPs. Existing SoC level verification methods are tedious and time consuming as they require a considerable amount of time for re-configuring connections between the IP cores and VIPs after the completion of the IP level verification. The number of interconnections increases manifold with the complexity of the IC, which further increases the verification time. Moreover, if an error in connections is identified during SoC level verification, the connections have to be re-configured afresh, which for an IC design with high complexity, may take multiple man weeks. Thus, existing testing tools and techniques introduce a significant delay in time-to-market (TTM) of an integrated circuit.

Both manual and automated integration methods result in an implementation unique to the selected parameters and generated interface. Although correct operation of an IP core may have been verified by the IP core provider, parameterization and interconnect IP generated by the designer or automated tool may change operation of the IP core. Thus, the function provided by the IP core must be verified after integration is completed. For this reason, a number of application areas, such as avionics, defense, etc., often require verification of the correct operation of the IP core as implemented in the circuit. In addition, various types of programs exist that cause unauthorized changes to the operation of IP cores. For example, email viruses, trojans, spyware, phishing scams, key-stroke loggers, and security exploits have all been used by unauthorized users to cause such changes in IP cores. As a result, attestation of an IP core is being used to verify that the IP core is safe to use for computing.

In general, attestation refers to the process of authenticating and attesting to the state of a computing platform and its operating system. The purpose of attestation is to allow a third party to obtain confidence in the identity and trustworthiness of a target platform before it interacts with the target. As such, attestation allows for changes in the computing platform to be detected by authorized parties. This process allows administrators to validate computing platform integrity and identify unauthorized changes. For example, software that has been correctly installed and configured is being affected by other software (for example malware) on the same computing platform or by software that has bypassed the operating system (for example a rootkit). Attestation of the computing platform allows the changes in the computing platform to be detected and the computing platform is not allowed to interact with a third party.

In some cases, attestation establishes a root of trust by measuring the system hardware and pre-launch software components are in a known good state. In some cases, attestation includes the use of a computer chip (microcontroller) that can securely store information (passwords, certificates, or encryption keys) used to authenticate the computing platform. In some cases, attestation includes a feature known as (remote) attestation in which a trusted platform can vouch for its own integrity.

Classifying an IP core as trusted means that the security risks presented by the IP core are managed, but it does not imply that the IP core is necessarily perfectly secure or invulnerable. A trusted IP core that is poorly managed will likely become a point of weakness for a network or computing system. When an IP core is considered trusted, other trusted IP cores can reasonably assume that the IP core will not initiate a malicious act. For example, a trusted IP core can expect that other trusted IP cores will not run a virus that attacks them, because all trusted IP cores are required to use mechanisms to verify their respective trusted states to mitigate the threat of viruses.

It is to be understood that the trusted state is not constant; it is a transitive state that is subject to changing security standards and compliance with those standards. New threats and new defenses emerge constantly. For this reason, management systems of an organization must continually check the trusted computers to ensure ongoing compliance. Additionally, the management systems must be able to issue updates or configuration changes if they are required to help maintain the trusted status. A computer that continues to meet all these security requirements can be considered trusted. However it is possible that some computers that are identified in the discovery process, discussed earlier, which do not meet these requirements.

An embodiment of the present invention recognizes that to verify trusted computing, the initial state of an IP core needs to be either pre-defined and/or verified before integration of that IP core into a computing system. An embodiment of the present invention recognizes that when an IP core is powered down and then back up again while the computing system is executing, that the trusted state of that IP core is verified. An embodiment of the present invention recognizes that when an IP core is exchanged while the computing system is executing, that the trusted state of the exchanged IP core is verified.

An embodiment of the present invention recognizes that verification of a trusted state of an IP core verifies that the IP core is not interfering maliciously with the functioning of the computing system. An embodiment of the present invention recognizes that verification of a trusted state of an IP core is completed such that the time required for that verification is minimized. An embodiment of the present invention recognizes that change to a structure of an IP core, as required to provide verification of a trusted state of that IP core, is minimized. An embodiment of the present invention provides discrete initialization of an IP core. An embodiment of the present invention provides verification of trusted state of an IP core by first verifying trusted state for some data registers (e.g., architecture and configuration state) of that IP core that are used for assembly language code and then verifying that the execution logic of the IP core remains idle for a period of time. An embodiment of the present invention provides clearing of memories contained in the IP core.

The present invention will now be described in detail with reference to the Figures.

FIG. 1 is a block diagram, illustrating a secure computing environment 100 that includes a computing system 101, which further included two IP cores, namely IP core 105 and IP core 110, in accordance with one embodiment of the present invention. FIG. 1 also illustrates a network, 160, connected to computing system 101. A description of network 160 is located in the discussion of FIG. 3. Computing system 110 may include internal and external hardware components, as depicted and described in further detail with respect to FIG. 3.

In the embodiment described herein, IP core 105 has been verified as being in a trusted state and is already included as part of the functioning of computing system 101. However, IP core 110 has not been verified and is therefore to be processed to verify its trusted state before possible inclusion as part of computing system 101. It is to be noted that some embodiments may take the form of integrated circuits, electronic circuits or other like devices which utilize the method(s) described herein, or incorporate the structure(s) described herein. Further, some or all of the method(s) and structure(s) described herein may be embodied as a computer program product or a computer system.

In various embodiments of the present invention, IP core 110 includes architecture state registers 115, check state device 116, execution logic 120, and memory/array 125, which further includes built in self-test (BIST) 126. The connectivity between architecture state registers 115, check state device 116, execution logic 120, and memory/array 125 are indicated in FIG. 1 via lines connecting them.

In the embodiment described herein, architecture state registers 115, execution logic 120, and memory/array 125 are all respectively scannable, i.e., can be scanned. In this embodiment, IP core 110 is connected to secure state machine 130. It should be noted that in some embodiments, architecture state registers 115, execution logic 120, and memory/array 125 are not all respectively scannable. For example, in some embodiments, latches are initialized by other methods such as Memory-mapped I/O (MMIO).

In general, secure state machine 130 communicates with check state device 116 to verify that architecture state registers 115 is secure. In other words secure state machine 130 communicates with check state device 116 to verify that the registers included in architecture state registers 115 are secure. The registers included in architecture state registers 115 are latchable and are thus vulnerable to state manipulations. Check state device 116 also communicates with secure state machine 130 to indicate whether execution logic 120 is idle, i.e., that no data output is being generated by execution logic 120, which would indicate that execution logic 120 was processing programming instructions. In general, check state device 116 is a finite-state machine (FSM) that indicates whether or not architecture state registers 115 is secure and whether execution logic 120 is idle.

Secure state machine 130 also communicates with BIST 126 to initiate a clearing of entries stored in memory/array 125. In addition, secure state machine 130 controls whether a functional clock signal, represented by dashed line 140, is received by IP core 110 and whether IP core 110 is allowed to be included as part of computing system 101. In FIG. 1, control of whether IP core 110 is allowed to be included as part of computing system 101 is illustrated using a dashed line numbered 150, which connects secure state machine 130 and output control 170. Output control 170 controls whether IP core 110 is allowed to send or receive data to and from computing system 101. In general secure state machine 130 is a device that divides entities, such as IP core 110, into subjects and objects, such as check state device 116 and memory/array 125, to formally prove that each preserves security. Thereby, it can be inductively proven that the system is secure. Such a secure state is built on the concept of a state machine with a set of allowable states in a system. The transition from one state to another state is defined by transition functions.

In general, the verification of the trusted state of IP core 110 is completed in three overall steps. First, the trusted states of a number of registers included in architecture state registers 115 are verified. Second, the entries included in memory/array 125 are cleared. Third, execution logic 120 is monitored to verify that no state machines, included in execution logic 120, are active or become active, i.e., exit idle state and generate output. These three overall steps are described in further detail below in the discussion of FIG. 2.

Figure 2:
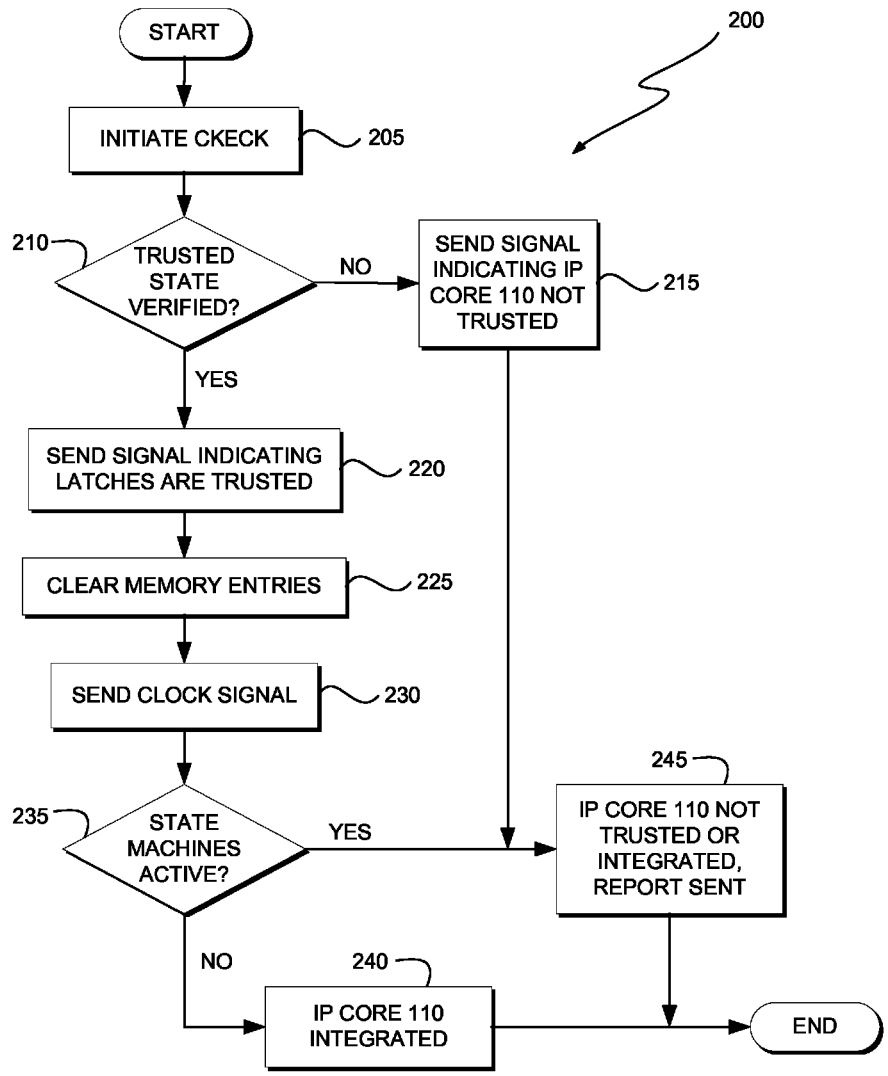
FIG. 2 illustrates the steps of a method to verify a trusted state for an IP core, on a computing system within the environment of FIG. 1, in accordance with an exemplary embodiment of the present invention.

FIG. 2, illustrates a flowchart, 200, for a method to verify a trusted state for an IP core, in accordance with an embodiment of the present invention. It should be noted that, as a starting scenario, IP core 110 is not a component being used by computing system 101 to process programming instructions. A functional clock signal is running to check state device 116 and secure state machine 130 but not to execution logic 120. In addition, architecture state registers 115, execution logic 120 and other untrusted logic of IP core 110 are isolated from computing system 101, via output control 170, such that computing system 101 cannot use that untrusted logic to process programming instructions.

In step 205, computing system 101 initiates a check of the trusted state of IP core 110. As such, check state device 116 checks a number of architecture state latches, included in architecture state registers 115, to verify their trusted state.

In decision step 210, check state device 116 determines whether the trusted state of the number of architecture state latches were verified, i.e., whether they are in a trusted state. If the trusted state of the number of architecture state latches was not verified, e.g., they were not in a trusted state or could not be checked, (decision step 210, NO branch), then check state device 116 sends a signal to secure state machine 130 indicating that IP core 110 is not trusted, in step 215, causing secure state machine 130 to proceed to step 245.

If the trusted state of the number of architecture state latches were verified, e.g., they were in a trusted state, (decision step 210, YES branch), then check state device 116 sends a signal to secure state machine 130 indicating that the number of architecture state latches are trusted, in step 220.

In response to receiving the signal indicating that the number of architecture state latches is trusted, secure state machine 130 clears the memory entries included in memory/array 125 using BIST 126, in step 225. In other embodiments, an alternative method and/or structure is used to clear the memory entries included in memory/array 125, as is known to those skilled in the art. In step 230, secure state machine 130 sends the functional clock signal to IP core 110.

In decision step 235, secure state machine 130 monitors the output of execution logic 120 to determine whether any of the state machines of execution logic 120 are active. If secure state machine 130 determines that none of the state machines of execution logic 120 are active (decision step 235, NO branch), then secure state machine 130 determines that IP core 110 is trusted and proceeds to step 240. In step 240, secure state machine 130 sends a signal that causes IP core 110 to be integrated as a component to be used by computing system 101 to process programming instructions. In some embodiments, secure state machine 130 monitors the output of other internal components, as are known and understood by those skilled in the art, to determine whether any of the state machines of execution logic 120 are active.

If secure state machine 130 determines that one or more of the state machines of execution logic 120 are active (decision step 235, YES branch), then secure state machine 130 determines that IP core 110 is not trusted and proceeds to step 245. In step 245, secure state machine 130 sends a signal that prevents IP core 110 from being integrated into computing system 101 to process programming instructions. In addition, secure state machine 130 sends a report indicating a security failure of IP core 110.

Figure 3:
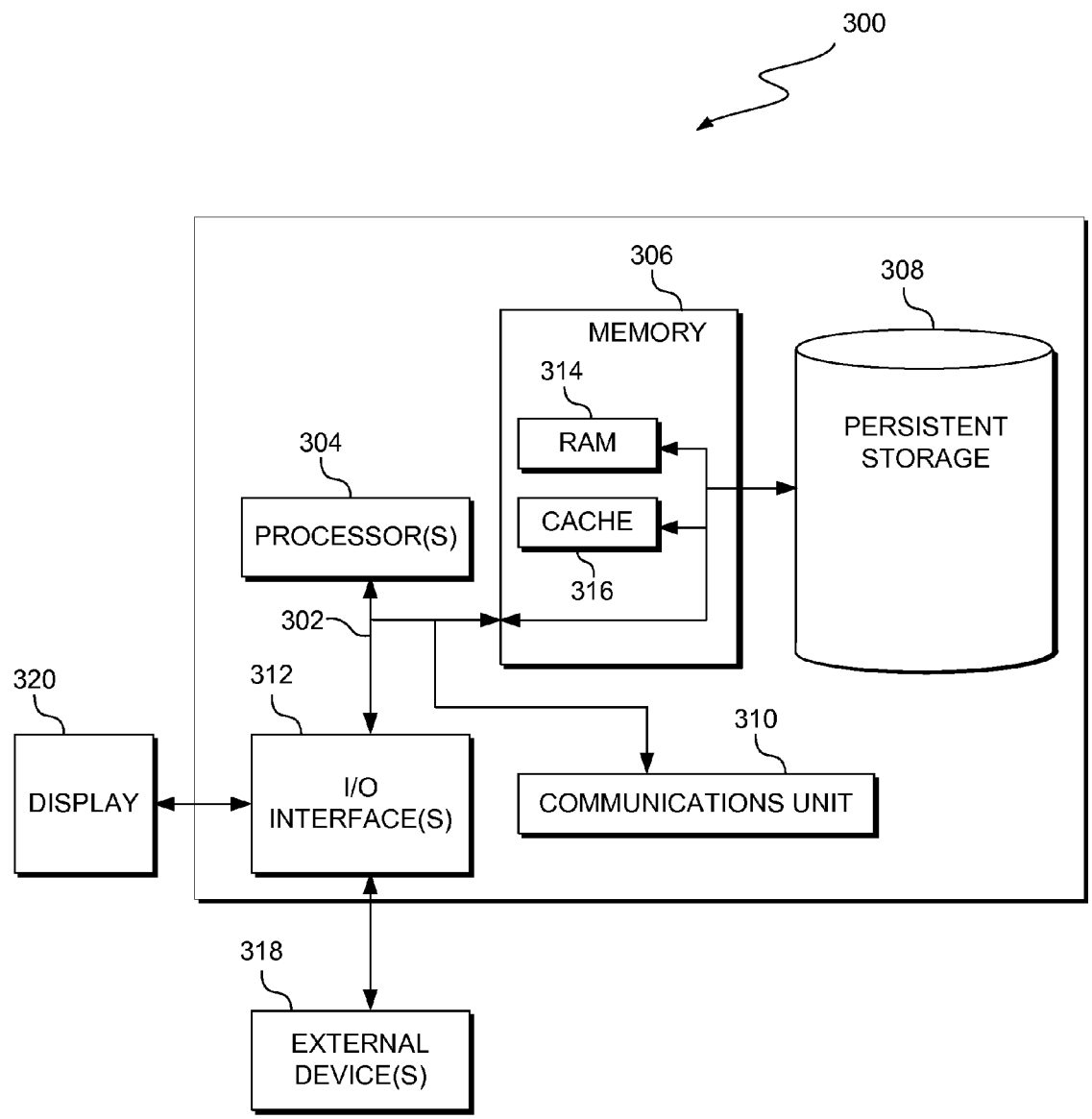
FIG. 3 depicts a block diagram of components of the computing system executing the method of FIG. 2, in accordance with an exemplary embodiment of the present invention.

FIG. 3 depicts a block diagram, 300, of components of computing system 101, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

In various embodiments of the present invention, computing system 101 is a computing device that can be a standalone device, a server, a laptop computer, a tablet computer, a netbook computer, a personal computer (PC), a desktop computer, a handheld computing device or any other mobile computing device. In another embodiment, computing system 101 represents a computing system utilizing clustered computers and components to act as a single pool of seamless resources. In general, computing system 101 can be any computing device or a combination of devices with access to IP core 105, IP core 110, architecture state registers 115, check state device 116, execution logic 120, memory/array 125, BIST 126 and output control 170, and is capable of following the method of FIG. 2.

Computing system 101 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Programs and data for the functioning of computing system 101 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 160. Network 160 can be, for example, a local area network (LAN), a wide area network (WAN) such as the Internet, or a combination of the two, and may include wired, wireless, fiber optic or any other connection known in the art. In some embodiments, network 160 represents the communicative connections between various components included in computing system 101. In general, network 160 can be any combination of connections and protocols that will support communications between computing system 101, IP core 105, IP core 110, architecture state registers 115, check state device 116, execution logic 120, memory/array 125, BIST 126 and output control 170, in accordance with a desired embodiment of the present invention. In these examples, communications unit 310 includes one or more network interface cards. Communications unit 310 may provide communications through the use of either or both physical and wireless communications links. Programs and data for the functioning of computing system 101 may be downloaded to persistent storage 308 through communications unit 310. In some embodiments, communication unit 310 is, similarly to processors 304, a type of IP core that is verified for trusted state to ensure the overall security/trust of the system.

I/O interface(s) 312 allows for input and output of data with other devices that may be connected to computing system 101. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 312. I/O interface(s) 312 also connect to a display 320. In some embodiments, I/O interface(s) 312 and communications unit 310 are, similarly to processors 304, a type of IP core that is verified for trusted state to ensure the overall security/trust of the system.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

Embodiments of the present invention may be used in a variety of electronic applications, including but not limited to advanced sensors, memory/data storage, semiconductors, microprocessors and other applications.

A resulting integrated circuit chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Having described the preferred embodiment of creating trusted state verification devices/structures (which are intended to be illustrative and not limiting), it is noted that modifications and variations may be made by persons skilled in the art in light of the above teachings.

The resulting integrated circuit chips (that incorporate one or more trusted state verification) can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

Each respective figure, in addition to illustrating the structure of the present invention at various stages, also illustrates the respective steps of the method for the fabrication/manufacture of trusted state verification devices/structures.

What is claimed is:

1. A method to securely initialize a state of an electronic circuit, the method comprising:
    determining, by a processor, of an electronic circuit, trusted state of one or more architecture state registers of an intellectual property core;
    clearing, by the processor, entries in a memory of the intellectual property core;
    verifying, by the processor, that state machines, included in execution logic of the intellectual property core, have not generated output by determining whether the trusted state one or more architecture state latches is verified based at least in part on a result generated by a first device of the intellectual property core that is configured to check the state of those architecture state latches, wherein the one or more architecture state latches are vulnerable to state manipulations; and
    responsive to a determination that the trusted state one or more architecture state latches is not verified, sending, by the first device of the intellectual property core, a signal that indicates that the intellectual property core is not trusted.

2. The method of claim 1, wherein clearing entries in the memory of the intellectual property core is initiated in response to a verification of the one or more architecture state registers as trusted.

3. The method of claim 1, wherein clearing entries in a memory of the intellectual property core includes sending a clock signal to the intellectual property core that allows execution logic, included in the intellectual property core, to process programming instructions.

4. The method of claim 1, wherein verifying, by the processor, that state machines, included in execution logic of the intellectual property core, have not generated output further comprises:
    responsive to a determination that the state machines have generated output, determining, by the processor, that the intellectual property core is not trusted.

5. The method of claim 1, wherein verifying, by the processor, that state machines, included in execution logic of the intellectual property core, have not generated output further comprises:
    responsive to a determination that the state machines have not generated output, integrating, by the processor, that the intellectual property core into the electronic circuit such that the intellectual property core is used to process programming instructions.

* * * * *